United States Patent [19]

Guy et al.

[11] Patent Number: 5,187,591
[45] Date of Patent: Feb. 16, 1993

[54] SYSTEM FOR TRANSMITTING AND RECEIVING AURAL INFORMATION AND MODULATED DATA

[75] Inventors: Kenneth R. Guy, Thousand Oaks; Andrew M. Kameya, Agoura Hills; Herbert M. Wildfeuer, Simi Valley, all of Calif.

[73] Assignee: Micom Communications Corp., Simi Valley, Calif.

[21] Appl. No.: 645,113

[22] Filed: Jan. 24, 1991

[51] Int. Cl.$^5$ ............................................... H04N 1/32
[52] U.S. Cl. ..................................... 358/425; 358/434
[58] Field of Search ................... 379/63, 90, 100, 89; 358/425, 434

[56] References Cited

U.S. PATENT DOCUMENTS

| | | | |
|---|---|---|---|
| 3,992,589 | 11/1976 | Kuegler | 379/90 |
| 4,279,002 | 7/1981 | Rider | 358/425 |
| 4,847,694 | 7/1989 | Nishihara | 358/434 |
| 5,003,577 | 3/1991 | Ertz et al. | 379/89 |

Primary Examiner—Stephen Brinich
Attorney, Agent, or Firm—Ellsworth R. Roston; Charles H. Schwartz

[57] ABSTRACT

Modulated data information having an individual one of different baud rates and aural information are converted at a transmitter from analog to digital form. A controller separately identifies the digitized aural and modulated data information and, if modulated data, identifies the baud rate of such modulated data. The aural information is separately transformed. For modulated data, the information is separately processed in accordance with the different baud rates. The individual ones of aural and modulated data are then introduced to a common line for packetizing. The beginning of each packet is labelled to identify whether the packet contains aural information (such as voice or music) or modulated data (such as modem or facsimile), and, if modulated data, the particular baud rate of such information. An individual code identifies the end of each packet. The packetized information is then multiplexed in a common bus with other packetized aural and data information. At a receiver connected to the common bus, the multiplexed information is separated into the different packets. The packetized information representing individual ones of aural information (such as voice or music) and modulated data (such as music or facsimile information) is separated, in accordance with the packet labels, into aural information and modulated data and, if modulated data, is introduced to an individual one of different modulators each operative at an individual one of the different baud rates. The aural information is then transformed substantially to its original form at the transmitter and the modulated data is separately processed in accordance with the different baud rates.

30 Claims, 3 Drawing Sheets

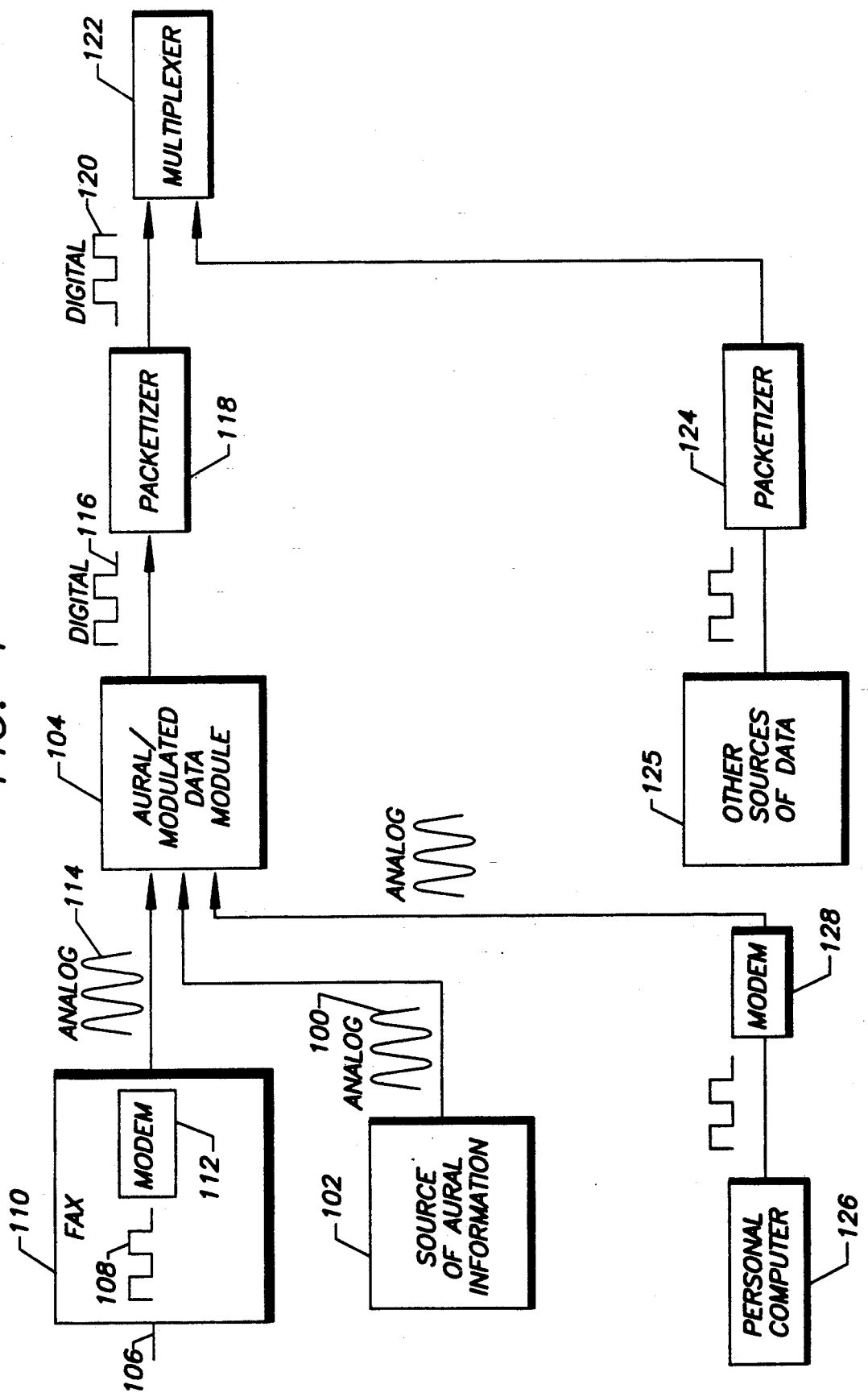

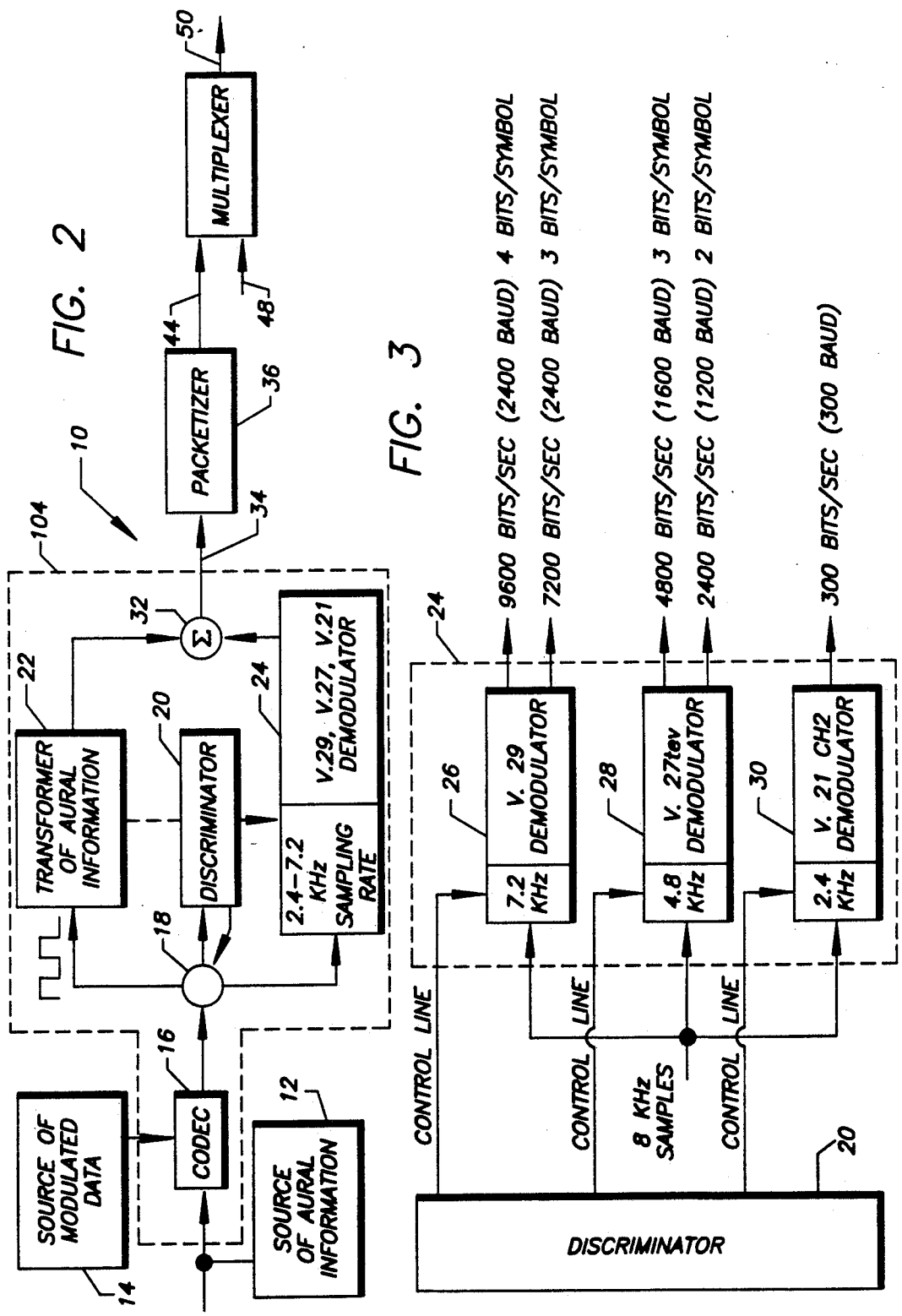

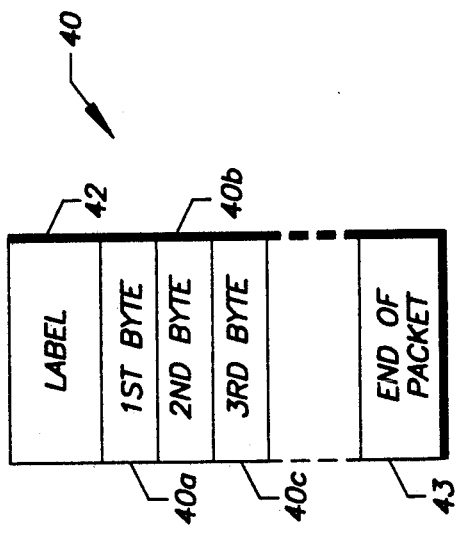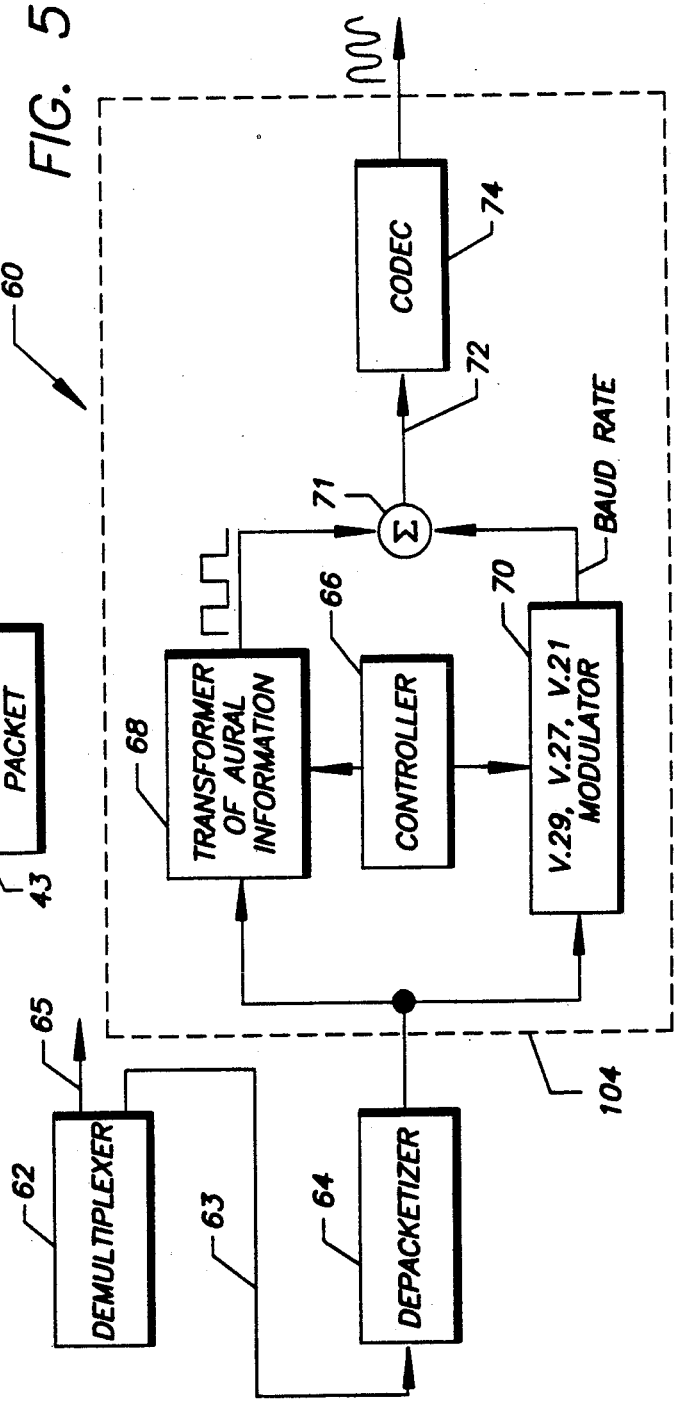

SYSTEM FOR TRANSMITTING AND RECEIVING AURAL INFORMATION AND MODULATED DATA

This invention relates to a system for transmitting aural information and modulated data through a common line and for separately identifying the aural information and modulated data before introduction to the common line so that the aural information and modulated data can be separately processed. The invention also relates to a system for receiving the aural information and modulated data passing through the common line, for identifying whether the received information is aural information or modulated data and for separately processing the aural information and modulated data in accordance with such identification.

The transceiver system of this invention is advantageous because it is transparent. In other words, the transceiver system transmits and receives the aural information and modulated data without any communication between the transceiver system and the source of the aural information or the modulated data to interrupt the transmission of the aural information or modulated data.

There is an ever increasing use of transmission lines for the transmission and reception of information in various forms. Transmission lines have been used to transmit aural information (such as voice or music) for many years. Transmission lines have more recently been used to transmit and receive modulated data such as modem data and facsimile images.

With the proliferation in the different kinds of information transmitted and received through the transmission lines, it has become progressively difficult to process this information. For example, apparatus has had to be provided for communicating with the information source(s) to determine the particular type of information, such as aural information or modulated data, which is being transmitted. This has interrupted the transmission of the information such as aural information or modulated data through the transmission lines.

Another difficulty progressively being encountered is that the communication to determine the type of information being transmitted has required that the different types of information (such as aural information and modulated data) be transmitted on different lines. This has resulted in duplication of charges for transmitting the different types of information between a transmitting location and a receiving location.

This invention provides a transceiving system (transmitter and receiver) for overcoming the inadequacies specified above. The transceiver provides for the transmission of different types of information, such as aural information (such as voice or music) and modulated data (e.g. modem, facsimile), through a single transmission line. The transceiver also determines, on a transparent basis, the particular type of information being transmitted through the line at any instant and provides for a processing of this information in accordance with the type of information (e.g. aural information or modulated data) being processed. The transceiver is transparent because it provides this determination without interrupting the transmission of the information from the information sources.

In one embodiment of the invention, aural information (such as voice or music) and modulated data (such as facsimile or modem) information are converted at a transmitter from analog to digital form. The modulated data has an individual one of a plurality of different baud rates. A controller separately identifies the digitized aural information and modulated data and, if modulated data, identifies the baud rate of such modulated data. The aural information is separately transformed (as by digital signal processing). For modulated data, the information is separately processed in accordance with the different baud rates.

The individual ones of encoded aural information and modulated data are then introduced to a common line for packetizing. The beginning of each packet is labelled to identify whether the packet contains aural information (such as music or voice) or modulated data (such as modem or facsimile information) and, if modulated data, the particular baud rate of such information. An individual code identifies the end of each packet. The packetized information is then multiplexed in a common bus with other packetized aural information and modulated data.

At a receiver connected to the common bus, the multiplexed information is separated into the different packets. The packetized information representing individual ones of aural information (such as music or voice) and modulated data (such as modem or facsimile information) is separated, in accordance with the packet labels, into aural and modulated data lines and, if modulated data, is introduced to an individual one of different modulators each operative at an individual one of the different baud rates. The aural information is then transformed substantially to its original form at the transmitter and the facsimile information is separately processed in accordance with its baud rate.

In the drawings:

FIG. 1 is a diagram schematically illustrating a system for processing information such as aural information and modulated data and schematically illustrating where the sub-systems of this invention fit in such a system;

FIG. 2 is a block diagram schematically illustrating the construction of an embodiment of a transmitter included in the sub-system of this invention for transmitting different types of information, such as aural information and modulated data, through a common transmission line;

FIG. 3 is a block diagram schematically illustrating in further detail the construction of equipment included in the embodiment of FIG. 2 for processing modulated data;

FIG. 4 is a schematic view of a packet of information transmitted through the common transmission line by the sub-system shown in FIGS. 2 and 3; and FIG. 5 is a block diagram schematically illustrating the construction of an embodiment of a receiver which is included in the sub-system of this invention and which is operative upon the signals passing through the common transmission line to recover the different types of information such as aural information and modulated data such as facsimile.

FIG. 1 is a block diagram schematically illustrating a system for processing information such as aural information and modulated data and schematically illustrating where the sub-systems of this invention fit in such a system. In the system shown in FIG. 1, aural information (such as voice or music) in analog form (schematically illustrated at 100) is introduced from a source of aural information 102 (such as a telephone) to an aural/-modulated data module 104 included in the sub-system of this invention. Information on a sheet of paper 106 is processed into digital form (schematically illustrated at 108) as by a facsimile machine 110. A modem 112 in the facsimile machine 110 converts the digital information 108 to an analog form 114 for introduction to the aural/-modulated data module 04. Although facsimile information is shown specifically in FIG. 1, the data information may be any type of modulated data as shown at 110 and 128 including facsimile information, modulated synchronous data, modulated asynchronous data and modulated data from local area networks. Furthermore, although the sources 102, 110 and 128 are shown separately in FIG. 1, it will be appreciated that aural information (such as voice or music) and modulated data (such as modem or facsimile) may be obtained from a single source introduced to the aural/modulated data module 104 over a common line.

The aural/modulated data module 104 converts the analog information (such as voice, music, modem and facsimile) into a digital form schematically illustrated at 116. A packetizer 118 then produces packets 120 of the digital information. The packets 120 of the digital information are introduced to a multiplexer 122 which also receives packets of information from other packetizers, (e.g. packetizer 124) as from other sources 125 of data or alternatively from a digitized aural source. A modem 128 receives the information from another source such as a personal computer 126 and introduces such information to the module 104 for processing. It will be appreciated that the personal computer 126 is shown only schematically and that the modem 128 may receive digital information from a number of different types of sources such as a data terminal, a data multiplexer or a local area network. For example, the information introduced to the modem 128 may be digitized aural information, demodulated facsimile information, synchronous data, asynchronous data and data from local area networks.

In one embodiment of the invention, a transmitter system generally indicated at 10 (FIG. 2) is provided. The system includes a source 12 of a first type of information such as voice or music and a source 14 of a second type of information such as facsimile or modem. The information from the sources 12 and 14 is introduced to a codec 16 which may be constructed in a manner well known in the art. Although the sources 12 and 14 are shown separately, it will be appreciated that information such as aural information and modulated data may be obtained from a single source introduced to the codec 16 over a common line.

The codec 16 converts analog information from the sources 12 and 14 to digital information representative of such analog information. The digitized information then passes through a switch 18 to a discriminator 20. It will be appreciated that the analog information may first pass through the switch and then be converted to digital information without departing from the scope of the invention.

The discriminator 20 operates to identify different types of information such as aural information and modulated data. For example, one way of distinguishing between aural information such as voice and modulated data such as facsimile is on the basis of variations in the frequency of the signals representing the aural information. For example, voice information has a variable frequency (such as between 300 hertz and 2000 hertz) dependent upon the pitch of the spoken word. The pitch of a person's voice varies considerably even in the spoken word depending upon such factors as the speaker's emotions. On the other hand, facsimile information is provided at one of a plurality of constant baud rates.

Signals pass from the discriminator 20 to the switch 18 (FIG. 2) to direct the switch to pass the signals coming in to the switch either to a transformer 22 of aural information or to demodulator equipment 24 depending upon whether the in-coming signals have a variable frequency or a constant frequency. The transformer 22 transforms the aural signals (such as by digital signal processing) in a manner well known in the art.

Although the modulated data signals have a constant baud rate, this baud rate may be different for different types of modulators such as those used in facsimile equipment. For example, a first type of modulator may provide binary bits at a rate of ninety six hundred per second (9600/sec.) or at a baud rate of twenty four hundred (2400/sec.), assuming four (4) bits in each symbol. Alternatively, the first type of modulator may provide binary bits at a rate of seventy two hundred per second (7200/sec.) or twenty four hundred baud (2400/sec), assuming three (3) bits per symbol. A second type of modulator may provide binary bits at a rate of forty eight hundred per second (4800/sec.) or sixteen hundred baud (1600/sec.) with three (3) bits per symbol. Alternatively, the second modulator may provide binary bits at a rate of twenty four hundred per second (2400/sec.) or twelve hundred baud (1200/sec.) with two (2) bits per symbol. A third type of modulator may provide bits at a rate of three hundred per second (300/sec.) or three hundred baud (300/sec.) with one (1) bit per symbol.

In addition to determining on the basis of a constant frequency that the information is from, for example, facsimile equipment, the discriminator 20 (FIG. 2) determines the baud rate of the facsimile signals, partly on the basis of bandwidth, to identify the particular type of modulator being used by the facsimile. For example, since the bandwidth of the third modulator (300 binary bits/second) is relatively narrow, the discriminator is able to identify data at 300 binary bits/second on the basis of this narrow bandwidth. The discriminator 20 is able to identify data at the other baud rates on the basis of encodings which are included in such facsimile data and which identify the different baud rates. These encodings are known in the art as "P2" or period two, an alternating pattern. The discriminator 20 then activates the demodulator 24 to provide signals at the proper rate. The demodulator 24 then processes the signals in accordance with the identification from the discriminator 20.

FIG. 3 illustrates in additional detail the relationship between the discriminator 20 and the demodulator 24 (shown in broken lines in FIG. 2). As will be seen, the demodulator 24 includes three (3) demodulators 26, 28 and 30. the demodulator 26 provides facsimile signals at baud rates of 2400 symbols/second (but with alternative bit rates of 9600/sec. and 7200/sec.). The demodulator 28 alternatively provides facsimile signals at baud rates of 1600 symbols/sec. (4800 bits per second) and 1200 symbols/sec. (2400 bits per second). The demodulator 30 provides facsimile signals at a baud rate of 300 symbols/sec. (with a bit rate of 300/sec.). Although the demodulators 26, 28 and 30 are shown in FIG. 3 as separate units, different demodulator functions such as those performed by the demodulators 26, 28 and 30 may be performed in a single unit.

The discriminator 20 selectively activates individual ones of the demodulators 26, 28 and 30 in accordance with the bandwidth of the data and the information represented by the encoding P2. For example, the demodulator 30 has a narrow bandwidth. When the discriminator 20 detects a narrow bandwidth, it activates only the demodulator 30. When the demodulator 26 is activated in accordance with the encoding (or preamble) P2, the discriminator 20 selects the baud rate of 2400/sec. on the basis of either 4 bits per baud or 3 bits per baud. When the demodulator 24 is activated in accordance with the encoding (or preamble) P2, the discriminator 20 selects between the baud rates of 1600/sec. and 1200/sec. The encoding (or preamble) P2 is well known in the art.

The demodulator 24 also provides another important function. It converts the 8 kilohertz sample rate of the codec to a sample rate which constitutes an integral multiple of each of the baud rates from the demodulators 26, 28 and 30. For example, the demodulator 26 operates at a sample rate of 7.2 kilohertz; the demodulator 28 operates at a sample rate of 4.8 kilohertz; and the demodulator 30 operates at a sample rate of 2.4 kilohertz. The sampling rate of various types of demodulators is between 2.4 and 7.2 kilohertz.

The discriminator 20 is able to provide the discrimination discussed above in a minimal period of time. For example, the discriminator 20 is able to provide this discrimination in a time no greater than one hundred (100) milliseconds. In this way, the discriminator 20 does not impede the transmission of information, whether aural information or modulated data, between the transmitter 10 and the receiver 60 shown in FIG. 5. Furthermore, the discriminator 20, the transformer 22 of aural information and the demodulator 24 operate without interrupting the operation of the source 12 of aural information and the source 14 of modulated data.

The signals from the transformer 22 of aural information and the demodulator 24 pass through a summer 32 (FIG. 2) and a common line 34 to a packetizer 36. The packetizer 36 corresponds to the packetizer 118 in FIG. 1. The summer 34, the discriminator 20, the transformer 22 of aural information, the demodulator 24 and the codec 16 may be considered to be included in the aural/modulated data module 104 of FIG. 1 as indicated in broken lines in FIG. 2.

The packetizer 36 converts the signals into time-spaced packets of information. The packetizing of information is well known in the art. A typical packet is generally indicated at 40 in FIG. 4. As shown, a packet 40 consists of a sequence of bytes each formed from a plurality of bits such as eight (8) bits. Each byte is shown schematically in FIG. 4 by a different horizontal area. Bytes 40a, 40b and 40c are illustratively shown schematically in FIG. 4. The bits in each byte are passed sequentially by the packetizer 36 and each successive byte is then passed sequentially. For example, the bits in byte 40a are passed sequentially, then the bits in byte 40b and thereafter the bits in byte 40c.

The beginning of each packet 40 of information is defined by a label 42 (shown schematically as a horizontal area in FIG. 4). The label 42 is provided with a binary code to identify whether the information in the packet 40 is aural information or modulated data and, if modulated data, to identify the particular modulator used and the particular one of the alternatives in the particular modulator if the modulator has two (2) alternatives. The packet 40 has a code 43 at the end to identify the end of the packet.

The packets of information from the packetizer 36 pass through a line 44 (FIG. 2) to a multiplexer 46 corresponding to the multiplexer 122 in FIG. 1. The multiplexer receives packets of signals through a line 48 from another source of information such as a source of data or of transformed aural information. The data may be demodulated facsimile, synchronous data, asynchronous data or data from a local area network. The multiplexer 46 sequentially passes signals to a transmission line 50 on a time-sharing basis from the lines 44 and 48. It will be appreciated that signals from a number of different information sources (whether aural information or modulated data) may be introduced in packets through lines (corresponding to the lines 44 and 48) to the multiplexer 46 for passage on a time-sharing basis through the transmission line 50.

FIG. 5 illustrates a system, generally indicated at 60, for receiving, decoding and restoring the information such as aural information (e.g. voice or music) and modulated data (e.g. facsimile or modem). The system 60 receives the packets, including the packets 40 of information passing through the transmission line 50 and includes a stage 62 for channeling the different packets 40 to different routes corresponding to the lines 44 and 48 in FIG. 2. The stage 62 may be constructed in a conventional manner. The signals packetized by the packetizer 36 in FIG. 2 pass from the demultiplexer 62 through a line 63 to a depacketizer 64 which detects the label 42 in the packet 40 (FIG. 4) to identify whether the information in the packet is aural information or modulated data and, if modulated data such as facsimile, to identify the baud rate. The signals from the de-multiplexer 62 also pass through a line 65 to a depacketizer (not shown) which depacketizes the packets from the packetizer 124 in FIG. 1.

The results of the label detection by the depacketizer 64 are introduced to a controller 66 which operates to activate a transformer of aural information 68 if the information in the packet 40 is aural information. The transformer 68 then transforms the information in the packet 40 (as by digital signal processing). The construction of the transformer 68 is well known in the art. If the information in the packet 40 is demodulated data, the controller 66 activates a modulator 70 which processes the demodulated data. The modulator 70 provides this processing by interpreting the modem type contained in the packet head and by then processing the demodulated data at the particular baud rat and bit rate in the packet 40 in accordance with such interpretation.

The signals from the transformer 68 and the modulator 70 are introduced to a summer 71 which introduces the signals to a common line 72. The signals then pass to a codec 74 which may be constructed in a conventional manner. The codec 74 converts the signals from digital to analog form to obtain a recovery of the original information at the transmitter 10 (FIG. 2). The transformer aural information 68, the controller 66, the modulator 70, the summer 71 and the codec 74 may be included in the aural/modulated data module 104 of FIG. 1 as indicated in broken lines in FIG. 5.

The apparatus described above has certain important advantages. It detects whether information being transmitted is aural information (such as voice or music) or modulated data (such as facsimile or modem) and, if modulated data, the particular baud and bit rate of the modulated data. The apparatus then separately transforms (as by digital signal processing) the aural information and separately processes the modulated data in accordance with the baud rate of the modulated data. The apparatus provides such detection and processing without interrupting the generation of the aural information and/or modulated data by the sources for such information. The apparatus is further advantageous in that it provides for the transmission of the transformed aural information and the processed modulated data through a single transmission line.

The apparatus constituting this invention is also advantageous in that it converts the modulated data to rates constituting an integral multiple of the different baud rates. constituting an integral multiple of the different baud rates. Another significant advantage of the apparatus constituting this invention is that it provides packets of the transmitted information and labels each packet to identify whether the packet contains transformed aural information (such as voice or music) or processed modulated data (such as modem or facsimile) and, if processed modulated data, the baud and binary bit rate of such processed modulated data.

The receiver of this invention also has certain important advantages. For example, it receives the packetized information on the single transmission line and identifies, from the label in each packet, whether the information in the packet is digitized aural information or modulated data and, if modulated data, the particular baud and bit rate of such modulated data. The apparatus is further advantageous in separately transforming (as by digital signal processing) the aural information in accordance with such identification and in processing the demodulated data in accordance with the baud and bit rate of such information. The apparatus is also advantageous in that it restores the processed modulated data to its original form and the transformed aural information to substantially its original form.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for transmitting modulated data and aural information,
   first means for providing modulated data having individual characteristics,
   second means for providing aural information,
   controller means operative at the position of the first and second means to identify the aural information from the second means and the modulated data from the first means and to identify the characteristics of such modulated data,
   third means responsive to the identification from the controller for transforming the aural information and for processing the modulated data in accordance with the characteristics of such modulated data, and
   packetizer means for packetizing individual ones of the transformed aural information and the processed modulated data and for labelling the packetized information to identify whether the information is aural or modulated data and, if modulated data, the characteristics of such modulated data.

2. In a combination as set forth in claim 1,
   the controller means is operative to identify the aural information by a variable frequency and to identify the modulated data by one of a plurality of constant frequencies and is operative to identify the characteristics of the modulated data.

3. In a combination as set forth in claim 1,
   a common line for transmitting the transformed aural information and the processed modulated data,
   the packetizer means being connected to the common line for packetizing and labelling individual ones of the transformed aural information and the processed modulated data and for introducing the packetized and labeled information to the common line.

4. In a combination as set forth in claim 3,
   fourth means displaced from the first means and the second means for receiving the packetized and labeled aural information and modulated data transmitted through the common line and for restoring the aural information and the modulated data.

5. In a combination as set forth in claim 4,
   the modulated data constituting facsimile information having different baud rates,
   the third means being operative to process the facsimile information in accordance with the different baud rates of the facsimile information, and
   the fourth means being operative to restore the facsimile information in accordance with the different baud rates of the facsimile information.

6. In a combination as set forth in claim 1,
   the controller means being operative, without interrupting the operation of the first means or the second means, to identify the aural information from the second means and the modulated data from the first means and to identify the characteristics of the modulated data.

7. In combination for transmitting modulated data and aural information,
   first means for providing modulated data and information identifying the characteristics of such modulated data,
   second means for providing aural information
   controller means responsive to the modulated data and to the voice information for identifying whether the information is aural or modulated data and, if modulated data, the characteristics of such modulated data,
   third means operatively coupled to the controller means for transforming the aural information,
   fourth means operatively coupled to the controller means for processing the modulated data,
   a common line, and
   fifth means for providing for a transmission through the common line of the aural information transformed by the third means and the modulated data processed by the fourth means.

8. In a Combination as recited in claim 7,
   the fifth means including means for labelling, for transmission through the common line, whether the information being transmitted through the common line is transformed aural information or processed modulated data and, if processed modulated data, the characteristics of such modulated data.

9. In a combination as recited in claim 7,
   means disposed at a position displaced from the first and second means and responsive to the transformed aural information and the modulated data passing through the common line for restoring such aural information and modulated data.

10. In a combination as recited in claim 8,
second controller means disposed at a position displaced from the first and second means and responsive to the labelling in the information in the common line for identifying whether the information is aural or modulated data and, if modulated data, the characteristics of such modulated data, and
sixth means including means for processing the information in the common line in accordance with the identification from the labelling as to whether the information is aural or modulated data and, if modulated data, the characteristics of such modulated data.

11. In a combination as set forth in claim 7,
the modulated data constituting facsimile information and the facsimile information having different baud and bit rates,
the controller means being operative to identify the facsimile information and the different baud and bit rates of such facsimile information, and
the labelling means in the fifth means being operative to label the facsimile information and the baud and bit rates of the facsimile information.

12. In a combination as recited in claim 7,
the controller means being responsive to the modulated data and to the aural information, without interrupting the operation of the first and second means, for identifying whether the information is aural or modulated data and, if modulated data, the characteristics of such modulated data.

13. In combination for transmitting facsimile and aural information,
first means for providing facsimile information and for identifying the baud and bit rates at which the facsimile information is provided,
second means for providing aural information,
controller means responsive to the aural information and the facsimile information for identifying between the aural information and the facsimile information and, if facsimile information, the baud and bit rates of the facsimile information without interrupting the operation of the first and second means,
third means operatively coupled to the controller means for transforming the aural information when the aural information is identified by the controller means,
fourth means constructed to process the facsimile information in accordance with the baud and bit rates of the facsimile information when the facsimile information is identified by the controller means, and
fifth means for providing a transmission of the transformed aural information and the processed facsimile information.

14. In a combination as set forth in claim 13,
the transmission means including means for labelling the transmission of the transformed aural information and the processed facsimile information to identify whether the transmission is aural or facsimile information and, if facsimile, the baud and bit rates of such facsimile information.

15. In a combination as set forth in claim 13,
a common line,
the transmission means including packetizing means for producing time-spaced packets of the transformed aural information and the processed facsimile information for transmission through the common line,
the packetizing means including means for labelling the beginning of each of the time-spaced packets to identify whether the packet provides aural information or facsimile information and, if facsimile information, the baud and bit rates of such facsimile information and for identifying the end of each packet.

16. In a combination as set forth in claim 15,
the packetizer means constituting a first packetizer means,
there being at least another source of aural information or modulated data and another packetizer means for producing time-spaced packets of such aural information and modulated data, and
multiplexer means operative to multiplex between the time-spaced packets from the first packetizer means and the other packetizer means.

17. In a combination as set forth in claim 13,
sixth means displaced from the transmission means and responsive to the transmission of the transformed aural information and the processed facsimile information, for identifying the encoded transmitted information, and
seventh means operatively coupled to the sixth means for decoding the encoded information identified by such last mentioned means.

18. In a combination as set forth in claim 14,
sixth means displaced from the fifth means and responsive to the labelling in the transmitted information for identifying whether the transmitted information is aural or facsimile and, if facsimile, the baud and bit rates of such facsimile information, and
seventh means operatively coupled to the sixth means for restoring the facsimile information provided by the first means and the aural information provided by the second means.

19. In combination at a receiver for responding to aural information and modulated data transmitted on a common line where the information is in packets and the packets are labelled to represent aural information or modulated data and, if modulated data, to represent the characteristics of such modulated data and where the aural information has been transformed and the modulated data has been processed,
first means for depacketizing the packetized information,
second means for detecting the labelling of the depacketized information to identify whether the depacketized information is aural information or modulated data and, if modulated data, the characteristics of such modulated data,
third means for operating upon the transformed aural information to recover the aural information before transformation,
fourth means for operating upon the processed modulated data to recover the modulated data before processing, and
fifth means operatively coupled to the second means for activating the individual one of the third means and the fourth means in accordance with the detection of the labelling by the second means to obtain a recovery of the voice information and the modulated data.

20. In a combination as set forth in claim 19, the aural information and the modulated data being converted from an analog form to a digital form before transmission, and means at the receiver for restoring the decoded aural information and the modulated data from the digital form to the analog form.

21. In a combination as set forth in claim 19, the modulated data constituting facsimile information and the facsimile information having different baud and bit rates and the labelling identifying the different baud and bit rates of the facsimile information, and the fourth means being responsive to the different baud and bit rates of the facsimile information to recover the facsimile information.

22. In a combination as set forth in claim 21, the aural and the facsimile information being converted from an analog form to a digital form before transmission, and means at the receiver for restoring the recovered aural and facsimile information from the digital form to the analog form.

23. In combination, first means for selectively providing aural information and modulated data and, if modulated data, the characteristics of such modulated data, controller means responsive to the aural information and modulated data for separating the aural information and modulated data and, if modulated data, for identifying the characteristics of such modulated data, second means operatively coupled to the controller means for transforming the aural information, third means operatively coupled to the controller means for processing the modulated data in accordance with the characteristics of such modulated data, a common line, and fourth means in the common line for labelling the transformed aural information and the processed modulated data to identify whether the information is aural information or modulated data and, if modulated data, to identify the characteristics of the modulated data.

24. In a combination as set forth in claim 23, the modulated data constituting facsimile information having different baud and bit rates, the controller means for the facsimile information including means for identifying the different baud and bit rates of the facsimile information, and the third means processing the facsimile information in accordance with the different baud and bit rates of the facsimile information.

25. In a combination as set forth in claim 23, the fourth means including fifth means for producing time-spaced packets of the aural information and modulated data and for labelling whether the information in each packet is aural information or modulated data and, if modulated data, the characteristics of such modulated data.

26. In a combination as set forth in claim 25, sixth means for providing other aural information and modulated data and for packetizing such information into time-spaced packets, and seventh means for multiplexing the packets of the serial information and modulated data from the fifth means and the packets of the aural information o modulated data from the sixth means.

27. In a combination as set forth in claim 26, means responsive to the labelled aural information and modulated data for separating the aural information and the modulated data in accordance with such labelling and, if modulated data, for separating the modulated data in accordance with the characteristics of the modulated data, and means for separately transforming the aural information to recover the voice information and for processing the modulated data to recover the modulated data.

28. In a combination as set forth in claim 24, fifth means responsive to the labeled information in the common line for identifying, in accordance with the labelling, the aural information and the modulated data and, if modulated data, the characteristics of the modulated data, sixth means responsive to such identification for separately transforming the aural information to recover the voice information, and seventh means responsive to such identification for separately processing the modulated data in accordance with the characteristics of such modulated data to recover such modulated data.

29. In a combination as set forth in claim 25, means for depacketizing the packets of aural information and modulated data, means responsive to the labelled information in the common line for identifying, in accordance with the labelling, the aural information and the modulated data and, if modulated data, the characteristics of the modulated data, means responsive to such identification for separately transforming the aural information in the common line to recover the aural information, and means responsive to such identification for separately processing the modulated data in the common line in accordance with the characteristics of such modulated data to recover such modulated data.

30. In a combination as set forth in claim 28, the modulated data constituting facsimile information and the characteristics of the modulated data constituting different baud and bit rates, the controller means being operative to identify whether the information is aural information or facsimile and, if facsimile, to identify the different baud and bit rates of such facsimile information, the fourth means being operative to label the facsimile information in accordance with the baud and bit rates of such facsimile information, the sixth means being operative to identify the facsimile information in accordance with the baud and bit rates of the facsimile information, and the seventh means being operative to process the facsimile information in accordance with the baud and bit rates of the facsimile information.

* * * * *